US006966498B2

(12) United States Patent
Huang et al.

(10) Patent No.: US 6,966,498 B2
(45) Date of Patent: Nov. 22, 2005

(54) SOLAR RADIATION COMPENSATION METHOD FOR A VEHICLE CLIMATE CONTROL

(75) Inventors: Lin-Jie Huang, East Amherst, NY (US); Prasad Shripad Kadle, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/829,543

(22) Filed: Apr. 22, 2004

(65) Prior Publication Data

US 2005/0235668 A1    Oct. 27, 2005

(51) Int. Cl.[7] .............................................. B60H 1/32
(52) U.S. Cl. .................... 236/91 C; 62/208; 62/244; 165/202
(58) Field of Search ........................ 62/208–209, 244; 165/42, 43, 202; 236/51, 91 C, 91 E

(56) References Cited

U.S. PATENT DOCUMENTS

| | | | | |
|---|---|---|---|---|
| 4,441,405 A | * | 4/1984 | Takeuchi ..................... 454/75 |
| 4,919,328 A | | 4/1990 | Hara et al. ................. 236/49.3 |
| 5,016,815 A | * | 5/1991 | Doi et al. ................... 236/49.3 |
| 5,337,802 A | * | 8/1994 | Kajino et al. ................ 165/203 |
| 5,553,661 A | * | 9/1996 | Beyerlein et al. ........... 165/203 |
| 5,765,383 A | * | 6/1998 | Inoue .......................... 62/209 |
| 5,810,078 A | * | 9/1998 | Knutsson et al. ........... 165/203 |
| 5,860,593 A | * | 1/1999 | Heinle et al. .............. 236/91 C |
| 6,202,934 B1 | * | 3/2001 | Kamiya et al. ........... 236/91 C |
| 6,220,517 B1 | * | 4/2001 | Ichishi et al. .............. 236/49.3 |
| 6,892,808 B2 | * | 5/2005 | Remond et al. ............ 165/203 |

FOREIGN PATENT DOCUMENTS

| | | |
|---|---|---|
| DE | 10208851 A1 | 9/2002 |
| EP | 0968855 A | 1/2000 |

\* cited by examiner

Primary Examiner—William E. Tapolcai
(74) Attorney, Agent, or Firm—Patrick M. Griffin

(57) ABSTRACT

A vehicle climate control is compensated for direct and indirect infrared heat loading due to solar radiation based on a mean radiant temperature sensor and a cabin air temperature sensor. The mean radiant temperature sensor include a temperature responsive element such as a thermistor enclosed in a hollow spherical housing that blocks visible light but absorbs infrared radiation. The difference between the mean radiant temperature and the cabin air temperature provides a measure of the total infrared heat loading on the cabin and is used to increase the cooling capacity of the climate control system.

4 Claims, 2 Drawing Sheets

US 6,966,498 B2

SOLAR RADIATION COMPENSATION METHOD FOR A VEHICLE CLIMATE CONTROL

TECHNICAL FIELD

This invention relates to motor vehicle climate control, and more particularly to method of compensating the operation of the system for solar radiation.

BACKGROUND OF THE INVENTION

Vehicle climate control systems typically include a microprocessor-based controller programmed to adjust the cooling capacity of the system based on a measure of the cabin air temperature and various other factors such as outside air temperature and solar loading. Solar loading is ordinarily measured by mounting one or more photovoltaic sensors under the windshield of the passenger compartment for producing a signal representative of the solar load on the passenger compartment. In current practice, the photovoltaic sensor comprises sensing element packaged in a spherical housing made of translucent plastic that passes attenuated visible light. The sensing element produces an electrical voltage that varies with the intensity of the impinging light, and the controller uses the voltage as a measure of solar loading.

Although a photovoltaic sensor of the type described above can provide a reliable measure of incident visible light, it does not necessarily provide a true indication of solar loading because it fails to take into account infrared radiation due to hot ambient and passenger compartment surfaces. Additionally, photovoltaic sensors are relatively expensive compared to mass-produced devices such as thermocouples or thermistors. Accordingly, what is needed is a more accurate and cost-effective way of detecting passenger compartment heating due to solar radiation and compensating the cooling capacity of a climate control system accordingly.

SUMMARY OF THE INVENTION

The present invention is directed to an improved vehicle climate control that is compensated for direct and indirect infrared heat loading due to solar radiation using a mean radiant temperature sensor and a cabin air temperature sensor. The mean radiant temperature sensor include a temperature responsive element such as a thermistor enclosed in a hollow spherical housing that blocks visible light but absorbs infrared radiation. The difference between the mean radiant temperature and the cabin air temperature provides a measure of the total infrared heat loading on the cabin and is used to increase the cooling capacity of the climate control system.

DESCRIPTION OF THE PREFERRED EMBODIMENT

Figure 1:
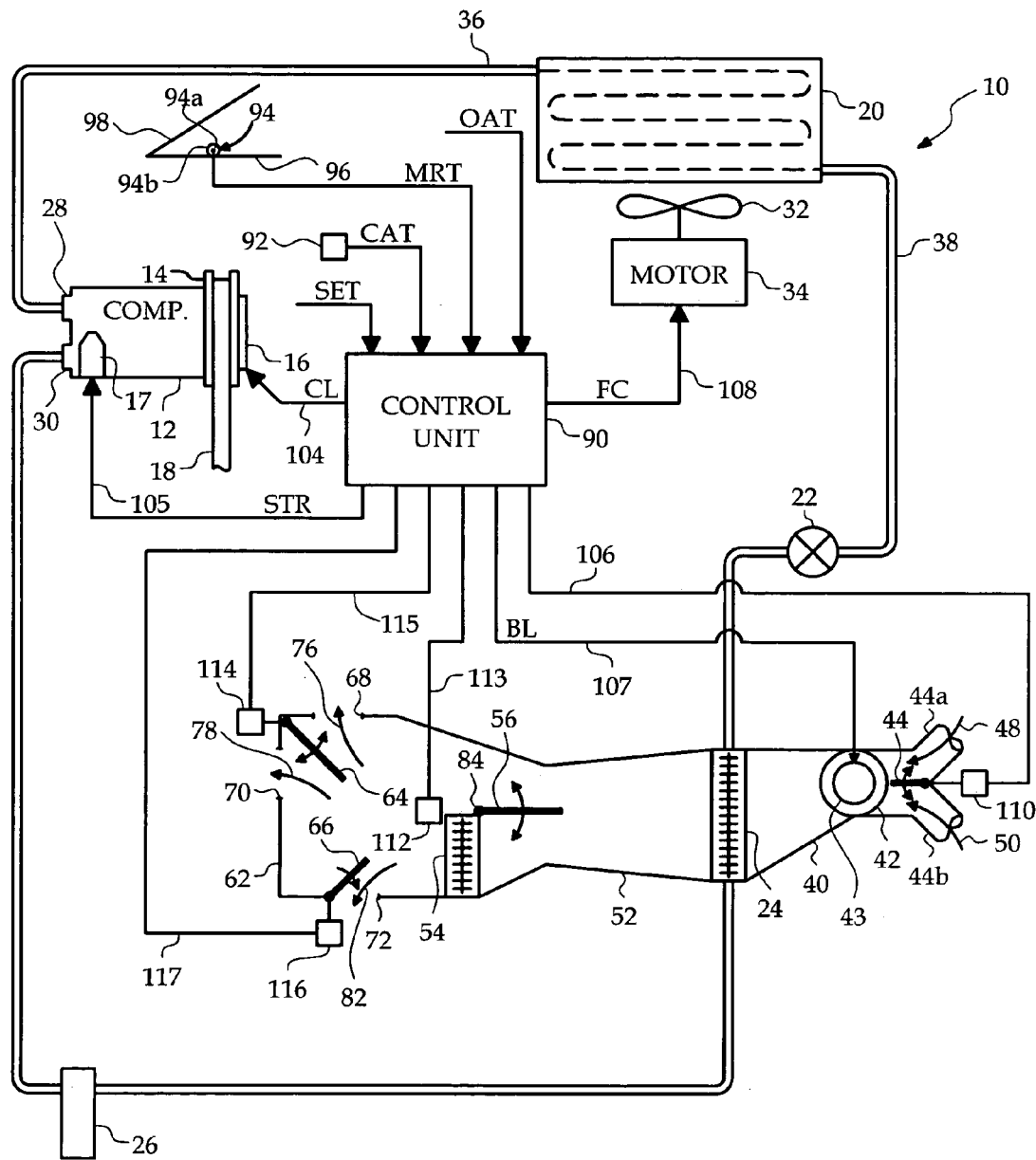
FIG. 1 is a block diagram of a vehicle climate control according to this invention, including a mean radiant temperature sensor and a microprocessor based climate control unit.

Referring to FIG. 1, the method of this invention is described in the context of an automatic climate control system, generally designated by the reference numeral 10. In the illustrated embodiment, the system 10 includes a variable capacity refrigerant compressor 12 having a stroke control valve 17 that is electrically activated to control the compressor pumping capacity. The compressor input shaft is coupled to a drive pulley 14 via an electrically activated clutch 16, and the drive pulley 14 is coupled to a rotary shaft of the vehicle engine (not shown) via drive belt 18, so that the compressor 12 can be turned on or off by respectively engaging or disengaging the clutch 16. In systems utilizing a fixed displacement compressor instead of the variable displacement compressor 12, the compressor pumping capacity may be regulated by cycling the clutch 16 on and off. The system 10 further includes a condenser 20, an orifice tube 22, an evaporator 24, and an accumulator/ dehydrator 26 arranged in order between the compressor discharge port 28 and suction port 30. The electric drive motor 34 of cooling fan 32 is controlled to provide supplemental airflow for removing heat from high pressure refrigerant in condenser 20. The orifice tube 22 allows the cooled high pressure refrigerant in line 38 to expand in isenthalpic fashion before passing through the evaporator 24. The accumulator/dehydrator 26 separates low pressure gaseous and liquid refrigerant, directs gaseous refrigerant to the compressor suction port 30, and stores excess refrigerant that is not in circulation. In an alternative system configuration, the orifice tube 22 is replaced with a thermostatic expansion valve (TXV); in this case, the accumulator/ dehydrator 26 is omitted, and a receiver/drier (R/D) is inserted in line 38 upstream of the TXV to ensure that sub-cooled liquid refrigerant is available at the TXV inlet.

The evaporator 24 is formed as an array of finned refrigerant conducting tubes, and an air intake duct 40 disposed on one side of evaporator 24 houses a motor driven ventilation blower 42 for forcing air past the evaporator tubes. The duct 40 is bifurcated upstream of the blower 42, and an inlet air control door 44 is adjustable as shown to control inlet air mixing; depending on the door position, outside air may enter blower 42 through duct leg 44a as indicated by arrow 48, and passenger compartment air may enter blower 42 through duct leg 44b as indicated by arrow 50.

An air outlet duct 52 disposed on the downstream side of blower 42 and evaporator 24 houses a heater core 54 formed as an array of finned tubes through which flows engine coolant. The heater core 54 effectively bifurcates the outlet duct 52, and a re-heat door 56 next to heater core 54 is adjustable as shown to divide the airflow through and around the heater core 54. The heated and un-heated air portions are mixed in a plenum portion 62 downstream of re-heat door 56, and a pair of mode control doors 64, 66 direct the mixed air through one or more outlets, including a defrost outlet 68, a panel outlet 70, and a heater outlet 72. The mode control door 64 is adjustable as shown to switch the outlet air between defrost and panel outlets 68, 70, as indicated by arrows 76, 78, respectively. The mode control door 66 is adjustable as shown to control airflow through the heater outlet 72, as indicted by arrow 82.

The above-described components of system 10 are controlled by the microprocessor-based control unit 90, which is responsive to a number of inputs, including outside air temperature (OAT), cabin air temperature (CAT), a an occupant adjustable set temperature (SET) and mean radiant temperature (MRT). Other inputs not shown in FIG. 1 include the usual operator demand inputs, such as the override controls for air delivery mode, air inlet door position, and blower motor speed. The OAT input may be provided by any temperature sensor responsive to the outside or ambient air temperature, while the CAT input is provided by a conventional aspirated temperature sensor 92 located in the cabin instrument panel. The MRT input is provided by a mean radiant temperature sensor 94 mounted atop the instrument panel 96 under the windshield 98. The sensor 94 simply comprises a temperature responsive element such as a thermistor 94a enclosed in a hollow spherical or semi-spherical black housing 94b that blocks visible light but absorbs infrared radiation produced by sunlight passing through windshield 98 or by solar heated objects in or near the vehicle cabin. As the radiation is absorbed by the black mass of the sensor housing 94b, the housing 9b emits heat to both the cabin air and the air within the housing 94b, and the air temperature detected by thermistor 94a provides a reasonably accurate estimate of the mean radiant temperature in the cabin. Although technically, mean radiant temperature is also a function of the airflow rate over the sensor 94, the sensor 94 is mounted in a location where the air velocity is very small so as to render negligible any airflow effects. In the illustrated embodiment, for example, the sensor 94 is mounted under the windshield 98 away from any air discharge outlets of the climate control system 10.

In response to the inputs mentioned above, the control unit 90 develops output signals for controlling the compressor clutch 16, the capacity control valve 17, the fan motor 34, blower motor 43, and the air control doors 44, 56, 64 and 66. In FIG. 1, the output signals CL, STR, FC and BL for clutch 16, stroke control valve 17, condenser fan motor 34, and blower motor 43 appear on lines 104, 105, 108 and 107, respectively. The air control doors 44, 56, 64, 66 are controlled by corresponding actuators 110, 112, 114, 116 via lines 106, 113, 115 and 117, respectively.

Figure 2:
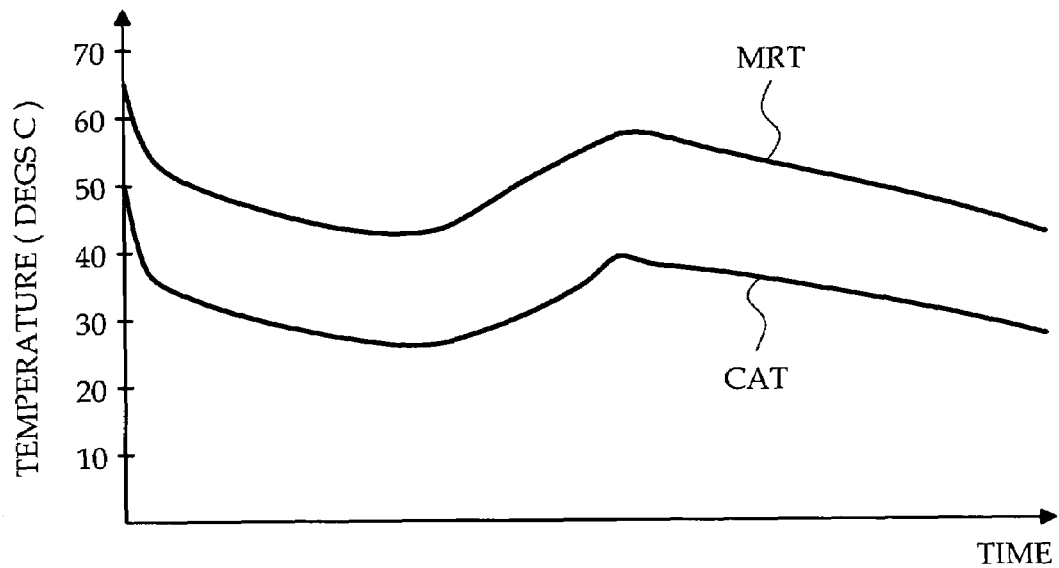
FIG. 2 is a graph depicting the relationship between the mean radiant temperature and cabin air temperature in a vehicle subject to a constant level of solar radiation.

As indicated above, the present invention is particularly directed to a way of using the mean radiant temperature in the vehicle cabin to determine and compensate for solar loading. FIG. 2 graphically depicts the MRT and CAT inputs of FIG. 1 for a vehicle operating at varying load under controlled environmental conditions, including an outside air temperature (OAT) of 110° F. and a solar load of 800 W/m². The solar load elevates the mean radiant temperature above the cabin air temperature, resulting in a difference between MRT and CAT which remains relatively constant as shown regardless of other vehicle operating conditions. As the solar load increases, the difference between MRT and CAT also increases, and vice-versa.

Figure 3:
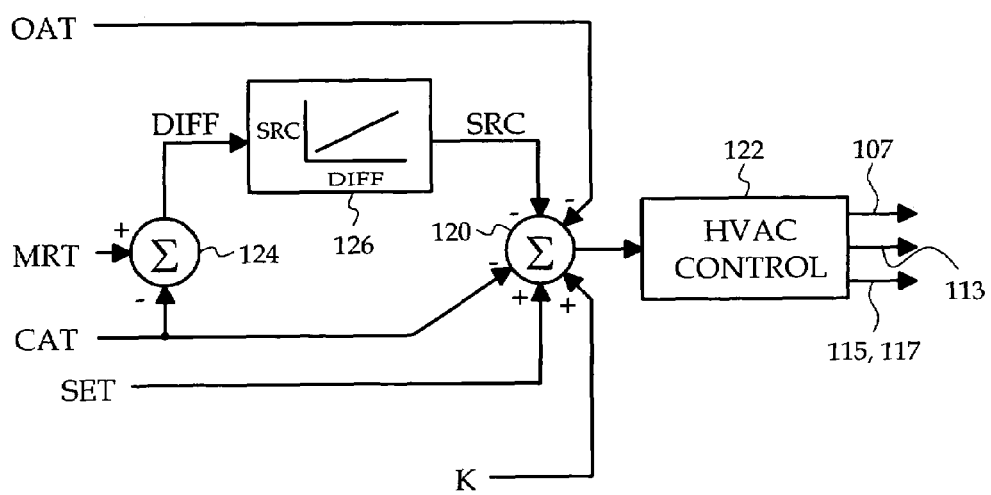
FIG. 3 is a block diagram depicting a method of operation carried out by the climate control unit of FIG. 1 according to this invention.

FIG. 3 depicts a block diagram of a climate control solar compensation algorithm carried out by the control unit 90 of FIG. 1 using the MRT and CAT inputs. The control is illustrated in the context of a "program number" control where various signals such as OAT, CAT and SET are combined in summing block 120 to form an input to an HVAC control routine, represented in FIG. 3 by the block 122. The block 12 may be implemented with calibrated look-up tables responsive to the program number input, and produces output signals on lines 107, 113, 115, 117 for controlling the blower motor speed, the outlet air temperature, and the air discharge mode. In the illustrated embodiment, the program number varies in inverse relationship to the desired cooling capacity; thus, the program number increases with increasing values of CAT and SET, and decreases with increasing values of OAT and solar radiation correction SRC. A calibrated constant K may also be introduced as shown. According to the present invention, a summing block 124 computes the difference DIFF between the MRT and CAT inputs, and supplies DIFF as an input to solar correction block 126. The solar correction block 126 may be implemented as a look-up table as shown, and develops the solar radiation correction term SRC as a calibrated but generally proportional function of DIFF.

In summary, the control of this invention provides an improved method of measuring the heating of a vehicle cabin due to solar radiation and for compensating the operation of a climate control in a way that contributes to increased passenger comfort. The method provides a more accurate measure of solar radiation, and can be implemented at a substantial cost savings compared to a conventional control. While this invention has been described in reference to the illustrated embodiment, it is expected that various modifications in addition to those mentioned above will occur to those skilled in the art. For example, the control is equally applicable to a so-called manual control system, and may be implemented with automatic climate control algorithms other than the disclosed "program number" approach. Likewise, the control is also applicable to systems that incorporate a fixed displacement compressor in place of the variable capacity compressor 12, and so on. Thus, it will be understood that control methods incorporating these and other modifications may fall within the scope of this invention, which is defined by the appended claims.

What is claimed is:

1. A method of operation of a climate control system for a vehicle cabin, including a controller for adjusting a cooling capacity of system to condition air in said cabin, the method of operation comprising the steps of:

measuring a mean radiant temperature in said cabin;

measuring an air temperature in said cabin;

computing a difference between said mean radiant temperature and said air temperature;

estimating a solar radiation intensity according to said difference; and adjusting said cooling capacity based on the estimated solar radiation intensity.

2. The method of operation of claim 1, wherein the cabin is bounded in part by a windshield, and the step of measuring the mean radiant temperature includes the steps of:

placing a hollow spherical or semi-spherical housing that blocks visible light but absorbs infrared radiation in the cabin under the windshield; and measuring said mean radiant temperature according to a temperature of air inside said housing.

3. The method of operation of claim 2, including the step of:

measuring the temperature of air inside said housing with a thermistor or thermocouple.

4. The method of operation of claim 3, wherein the step of estimating the solar radiation intensity includes the steps of:

storing a predefined relationship between said difference and said solar radiation intensity; and retrieving a stored value of radiation intensity based on the computed difference.

* * * * *